United States Patent [19]

Kawakami et al.

[11] Patent Number: 5,538,775
[45] Date of Patent: Jul. 23, 1996

[54] PAPER CUSHIONING MAT

[75] Inventors: Hajime Kawakami; Hideaki Akiya; Yuzo Ishino; Kozo Kemmotsu, all of Nagoya, Japan

[73] Assignee: Kawakami Sangyo Kabushiki Kaisha, Nagoya, Japan

[21] Appl. No.: 352,637

[22] Filed: Dec. 9, 1994

[51] Int. Cl.⁶ .................................................. B32B 9/00
[52] U.S. Cl. .................... 428/76; 428/34.2; 428/34.3; 428/118; 428/119; 428/125; 428/153; 428/194; 428/198; 428/481; 428/906; 206/521; 156/276; 156/549; 156/553
[58] Field of Search .................... 428/402, 118, 428/34.3, 906, 98, 118, 194, 481, 125, 76, 34.2, 119, 153, 198; 206/521; 156/276, 549, 353

[56] References Cited

U.S. PATENT DOCUMENTS 3,982,057  9/1976  Briggs et al. ............... 428/73
4,720,321  1/1988  Smith ........................ 156/549
5,312,665  5/1994  Pratt et al. .................. 428/402

FOREIGN PATENT DOCUMENTS 3355305  12/1991  Japan.

Primary Examiner—Patrick J. Ryan
Assistant Examiner—Abraham Bahta
Attorney, Agent, or Firm—Armstrong, Westerman, Hattori, McLeland & Naughton

[57] ABSTRACT

A paper cushioning mat for packaging and a method of producing the paper cushioning mat. The paper cushioning mat comprises two paper substrates and multiple paper cushioning pieces distributed between the substrates and adhered thereto. The paper cushioning pieces are made by cutting a coil prepared by rolling a single faced corrugated fiberboard and fixing with an adhesive crosswise to round slices of a certain thickness. Angle of cutting the coil may be inclined to the angle rectangular to the axis of the coil. The paper cushioning mat is used for packaging articles by, for example, laying the mat between the container walls and the article or by filling spaces. The mat can be reused, and easily disposed.

13 Claims, 5 Drawing Sheets

FIG.6
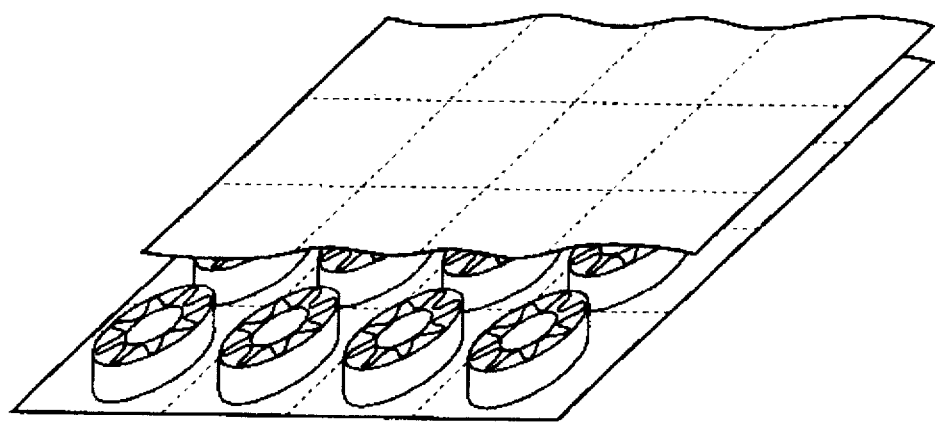
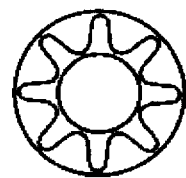
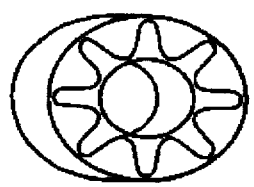
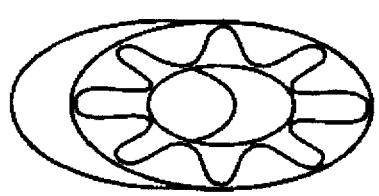
FIG. 7A     FIG. 7B     FIG. 7C
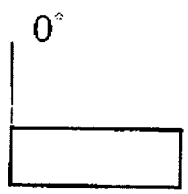
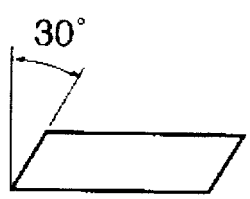
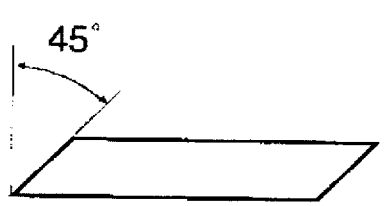
FIG. 8A     FIG. 8B     FIG. 8C Example 1

Example 2

Control

PAPER CUSHIONING MAT

BACKGROUND OF THE INVENTION

The present invention concerns a paper cushioning mat for packaging.

As cushioning materials for packaging there has been widely used foamed plastics such as foamed polystyrene in the form of molded blocks or discrete particles. Foamed plastics products are, however, kept at a distance by the customers because, when buried in the earth, they do not naturally decompose, and when burned in a conventional incinerator, they give irritating smell and black smoke.

The inventors intended to replace cushioning materials made of foamed plastics with those made of paper, and proposed a cushioning material made by rolling up a single faced corrugated fiberboard to a coil and a cushioning material made by further cutting the coil crosswise to round slices of a certain thickness (Japanese Utility Model Disclosure No.05-13966). Then, they proposed use of laminated products of a single faced corrugated fiberboard cut into small discrete particles, and the products made by fixing the laminates on a substrate (Japanese Patent Application No.03-355305).

The cushioning materials made by cutting single faced corrugated paper fiberboard products are, however, not suitable for packaging precision machines or electronic parts due to the paper dust formed by cutting. Further, apparent densities of laminated products of single faced corrugated fiberboard are such a high value. For example, that of "flute-A" which is used most widely is about 100 kg/m$^3$, and thus, even the above discrete cushioning material has such a high apparent density as about 20 kg/m$^3$, which is still high enough when compared with the apparent densities of foamed polystyrene products, about 9 kg/m$^3$. In order to make the cushioning materials lighter efforts were made to use a paper of lower basic weight or to reduce the amount of adhesives used. These trials, however, gave no practical solutions because of lowered strength of the material Single faced corrugated fiberboard.

SUMMARY OR THE INVENTION

An object of the present invention is to provide a improved cushioning material in the form of a mat made of single faced corrugated fiberboard, which has a lower apparent density, and from which no paper dust comes out.

Another object of the present invention is to provide a method of producing the above mentioned paper cushioning mat.

The paper cushioning mat of the present invention comprises two paper substrates and multiple paper cushioning pieces distributed between the substrates. The paper cushioning pieces in the present paper cushioning mat are made by rolling up a single faced corrugated fiberboard to a coil and fixing it with an adhesive, and cutting the coil into round slices. Both the ends of the cushioning pieces are adhered to the paper substrates.

BRIEF EXPLANATION OF THE DRAWINGS

FIG. 4 showing the step of preparing a single faced corrugated fiberboard; and FIG. 5 showing the subsequent step of preparing a hollow coil;

FIG. 6 is a perspective view like FIGS. 1 and 3 showing further embodiment of the paper cushioning material according to the invention;

FIGS. 7 and 8 illustrate varieties of the cushioning piece used for producing the cushioning mat shown in FIG. 6; FIG. 7 being plan views and FIG. 8 being side elevation views;

DETAILED EXPLANATION OF THE PREFERRED EMBODIMENTS

Figure 1:
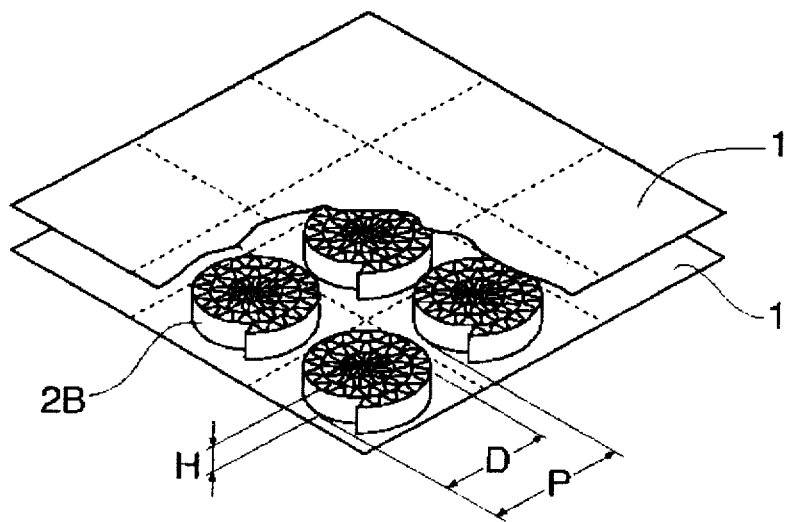
FIG. 1 is a perspective view of an embodiment of the cushioning mat according to the present invention, in which a part of one substrate is broken out.

In FIG. 1 cushioning piece 1 is such one that is made by rolling a single faced corrugated fiberboard to form a coil and fixing it with an adhesive, and then cutting the resulting coil to round slices, and the cushioning pieces thus prepared are distributed in lattice form between two paper substrates and adhered thereto. The coil made of the single faced corrugated fiberboard may be not only such one having a circular cross section but also a polygonal cross section such as a square cross section.

Relation between the height "H" and the diameter "D" of the cushioning piece 1 must be H<2D, preferably, 3H≦2D. If H is equal to or higher than 2D, the cushioning pieces tend to fall down at use of the cushioning mat, and as the result cushioning function of the mat will be lost. If 4H≦D, there is no probability of falling down of the cushioning pieces.

Pitch "P" with which the cushioning pieces are distributed on the paper substrates may be arbitrarily chosen as far as the cushioning material is used flatwise. In case of using the cushioning mat with bending, such as the cases of wrapping articles or filling spaces, it is preferable that the pitch and the height have the relation (P–H)>H/2.

Figure 2:
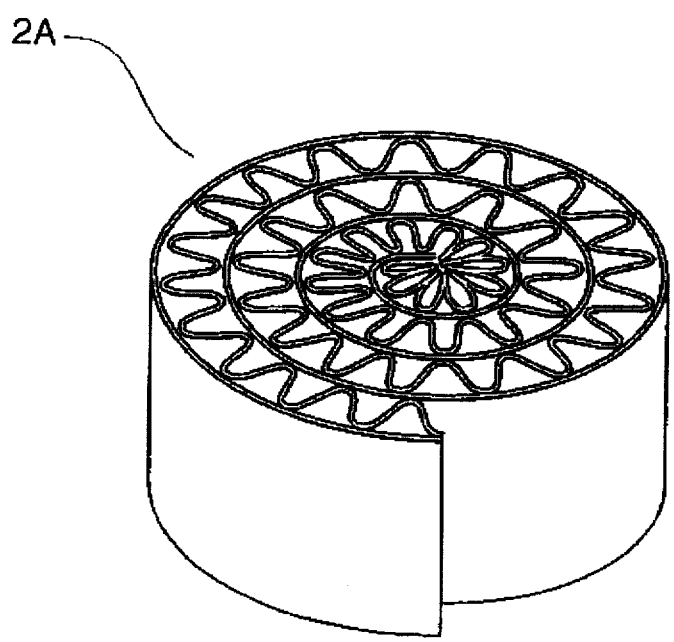
FIG. 2 is a perspective view showing one end of the coil made of a single faced corrugated fiberboard rolled up in a vortex form, from which the cushioning pieces are prepared.

Corrugation ratio, or the ratio of the length of the corrugated board to the length of the liner board, of the single faced corrugated fiberboard 4 of the coil in FIG. 2 should be in the range exceeding 1 to 2.5, preferably, 1.5 to 2.0. The corrugated board and the liner board may be chosen, in view of the use of the cushioning material, from those having a basic weight of 20–300 g/m$^2$.

The paper substrate may be any paper chosen from craft paper, thin paper, patron paper, liner board for corrugated fiberboard, corrugating medium, crepe paper, wadding and embossed paper. Laminates of two or more of these papers may also be used. Crepe paper is a kind of embossed paper having irregularity like creases. Wadding is the name of a laminates of some sheets of thin crepe paper used for tissue paper. Creases of the cushioning mat of this invention using wadding or crepe paper as the substrate are, even if formed, not conspicuous, and therefore, appearance of the package may not be damaged. The mats using wadding are suitable for packaging articles which should not have scratches such as furniture and objects of art.

Adhesives to be used in preparation of the coil and adhesion of the cushioning pieces to the paper substrates may be any of conventional adhesives such as polyvinyl acetate aqueous emulsion, starch paste, rubber-based adhesives and acryl resin-based adhesives.

Distribution of the cushioning pieces on the substrates may be not only the lattice form shown in FIG. 1 but also staggered form. The lattice may be square one with the same pitches in length and width, or rectangular one with different pitches in length and width. The lattice form distribution of the cushioning pieces is convenient for folding the product cushioning mat and this sort of the products is suitable for use as fillers to fill spaces of packaging containers. The lattice form distribution makes it easy to fold the paper cushioning mat. Also, this distribution is convenient for using perforated substrates.

On the other hand, the cushioning mat with staggered distribution of the cushioning pieces is convenient for protecting edges of the packed articles, because, when bent at wrapping the articles, the cushioning pieces appear on the edges of the articles. Therefore, this sort of the products are suitable for packaging furniture and the like, edges of which must be protected.

Figure 3:
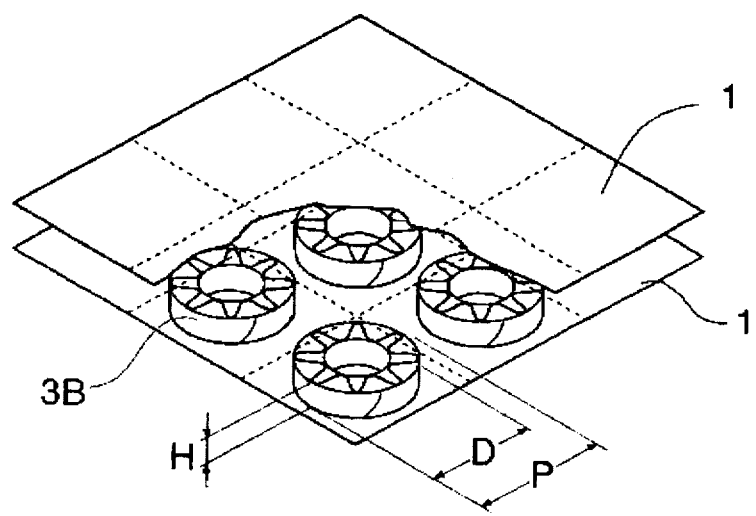
FIG. 3 is a perspective view like FIG. 1 showing another embodiment of the paper cushioning mat of the invention.
Figure 4:
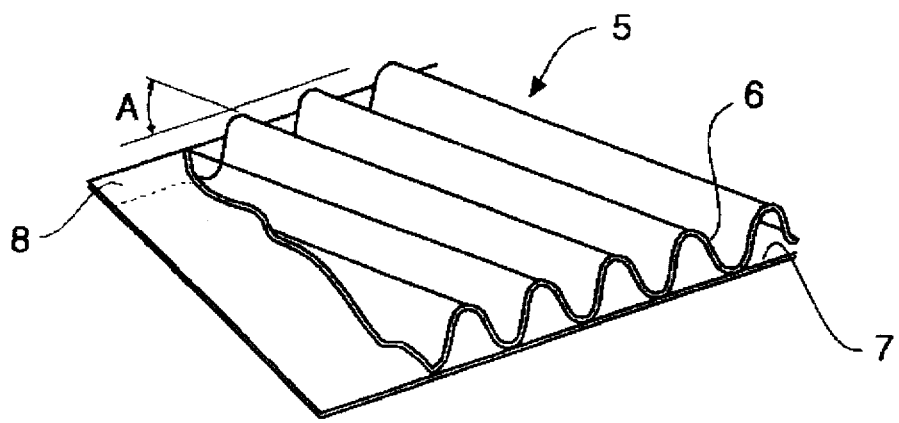
FIGS. 4 and 5 illustrate the method of producing the paper cushioning mat of the present invention.
Figure 5:
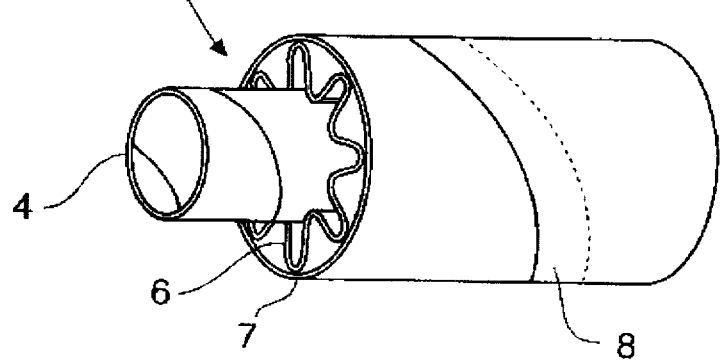

The method of producing the paper cushioning mat shown in FIG. 3 comprises the following steps:

a) preparing a single faced corrugated fiberboard tape in which direction of flutes is inclined to the direction rectangular to the longitudinal direction of the tape by adhering a corrugated board on a paper tape with providing margin to paste up at one edge, as shown in FIG. 4;

b) rolling the single faced corrugated fiberboard prepared in the above step (a) on a paper tube spirally under application of an adhesive on the margin to paste up to form a hollow coil, as shown in FIG. 5;

c) cutting the above hollow coil prepared in the above step (b) to produce plural cushioning pieces; and d) distributing the cushioning pieces produced in the above step (c) between two paper substrates and adhering both the ends of the cushioning pieces to the paper substrates.

The paper tube used in step (b) may be either previously prepared or produced at the same time of rolling up the single faced corrugated fiberboard on the paper tube. In the latter case, a tape of a liner board is rolled up spirally on a suitable rod-shaped mandrel and overlapped edges are fixed with an adhesive to produce a paper tube in continuous operation, and on the resulting paper tube the single faced corrugated fiberboard prepared in step (a) is continuously rolled up to form the hollow coil.

In step (b) there will occur substantially no difference in level at the overlapped portions of the tape. By choosing a suitable inclination of the flutes of the single faced corrugated fiberboard a hollow coil may have the flutes in the direction nearly parallel to the axis of the coil.

The hollow coil shown in FIG. 5 has only one layer of the rolled single faced corrugated fiberboard. It is of course possible to use the coil with two or more rolled layers of the single faced corrugated fiberboard.

At preparation of the cushioning pieces by cutting the coil the angle of cutting may be inclined to the angle rectangular to the axis of the coil. FIG. 6 shows the paper cushioning mat made with this kind of cushioning pieces. In FIGS. 7 and 8, "A" shows the case of cutting in the direction rectangular to the axis of the coil; "B", the case of inclination 30°; and "D", the case of inclination 45°. As seen from the working examples described below, different cutting angles may give the paper cushioning mats having different compression characteristics with the cushioning pieces made from the same coil. This enables production of various final products using the mass-produced same coil of a single faced fiberboards. If the angle of inclination is too small, there will be not substantial difference from the case of no inclination, and, if the angle is too large, buckling strength of the cushioning pieces will be too low. Practically suitable range of this inclination angles is, in general, 20°–50°.

Application of a sticking agent or a pressure sensitive adhesive on at least a part of the outer surface of the paper cushioning mat of this invention gives advantage that setting or locating the cushioning mat at packaging or box packing of the articles is easy. As the sticking agent for this purpose, those of lower softening points, such as modified polyvinyl acetate, acryl resin-base, rubber-base, higher alcohol-base, polybutene-base or aliphatic acid ester-base sticking agents are suitable. A glue which exhibits sticking property by applying water, such as PVA, may also be used.

In the paper cushioning mat of the invention cut ends of paper or both the ends of the paper cushioning pieces are covered with paper substrates and the ends of the cushioning pieces and the substrates are fixed with an adhesive, occurrence of the paper dust is almost completely prevented. Thus, the product is suitable for packaging precision instruments and electronic parts.

Workability of using the conventional discrete cushioning material is low because the particles scatter. The present cushioning mat solved this problem.

EXAMPLE 1

The paper cushioning mat illustrated in FIG. 1 and FIG. 2 was produced.

A single faced corrugated paper in which basic weights of both the corrugated medium and the liner board is 50 g/m$^2$ and the corrugation ratio is 1.6 was rolled up to a coil having an outer diameter of 35 mm and fixed. The coil was cut crosswise to round slices or cushioning pieces of 15 mm high.

A craft paper having a basic weight of 50 g/m$^2$ was used as the substrates and perforated with 75 mm pitch in both length and width. On one of the substrates the above cushioning pieces were distributed at the centers of each sections made by the perforations and adhered thereto. Another substrate was adhered on the cushioning pieces. As the adhesive a starch paste was used.

The product cushioning met was subjected to vibration test and compression test. Testing methods are as follows:

[Vibration Test]

An article of a box shape having outer dimensions of 285 mm×220 mm×170 mm and weighing 5 kg was contained in a box container having inner dimensions of 305 mm×310 mm×300 mm using the cushioning materials at the gaps of four sides by laying mats or filling particles of the cushioning material. The container was put on a vibrator, which vibrates with amplitude 20 mm and vibration 400 cycles/min., and subjected to vibration for 2 hours. Measurement and recording were made on the distances of the four gaps before and after vibration as well as the weight of the cushioning materials necessary for filling the gaps.

[Compression Test]

A tension/compression tester made by Tokyo Tester Manufacturing Co. "20160" was used. The samples were set in a container of base 150 mm×150 mm and depth 15 mm, and compressed by loading increased load up to 100 kg. Distortions of the samples were measured.

The results of the vibration tests are shown in Table 1; and the results of the compression tests, in FIG. 29.

EXAMPLE 2

The paper cushioning mat illustrated in FIG. 3 was produced using the coil shown in FIGS. 4 and 5.

A paper tube 8 was first prepared by spirally rolling a paper tape of 50 mm width made of a craft paper of basic weight 50 g/m$^2$ on a mandrel of outer diameter 24 mm with inclination angle of 22.5° and a margin to paste up 5 mm. A single faced corrugated fiberboard was prepared by adhering a corrugated paper of 45 mm wide made of a corrugation medium of basic weight 100 g/m$^2$ on a liner board of the same basic weight with a corrugation ratio 1.3, flute inclination angle 22.5° and margin to paste up 15 mm. The single faced corrugated fiberboard thus prepared was then rolled spirally on the paper tube with the flutes inside to form a hollow coil of outer diameter 40 mm. The coil was cut crosswise to prepare many cushioning pieces of 15 mm high.

A craft paper substrate of basic weight 50 g/m$^2$ was processed go give perforation of 80 mm pitch in length and width. The above cushioning pieces were distributed between two paper substrates and adhered thereto with starch paste to produce the cushioning mat of the invention.

Figure 9A:
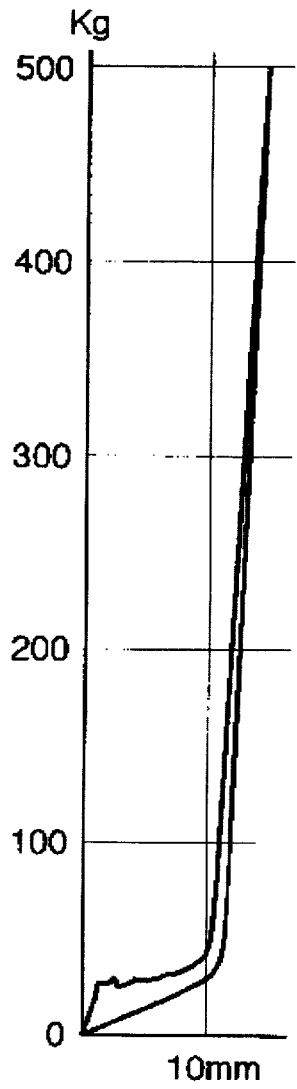
FIG. 9 shows stress-strain curves obtained in compression tests of the paper cushioning mats produced in Example 1.
Figure 9B:
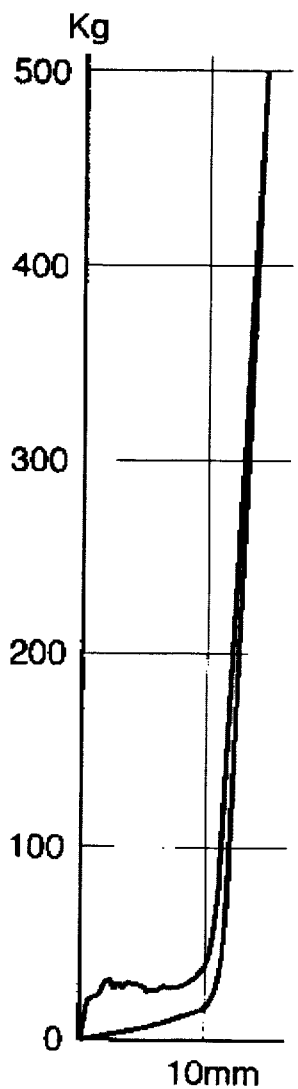
Figure 9C:
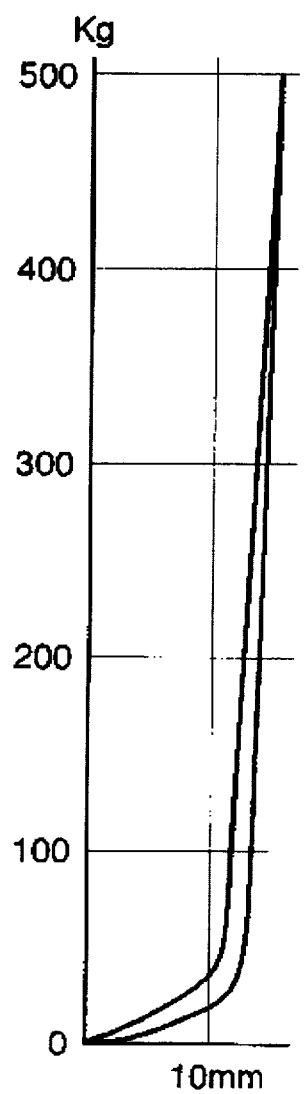
Figure 10A:
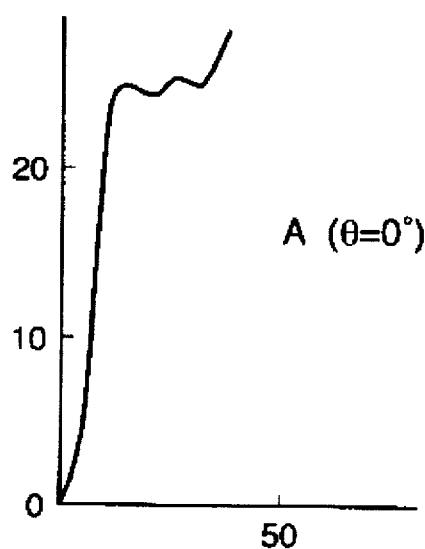
FIG. 10 shows stress-strain curves obtained in compression tests of the paper cushioning mats produced in Example 3.
Figure 10C:
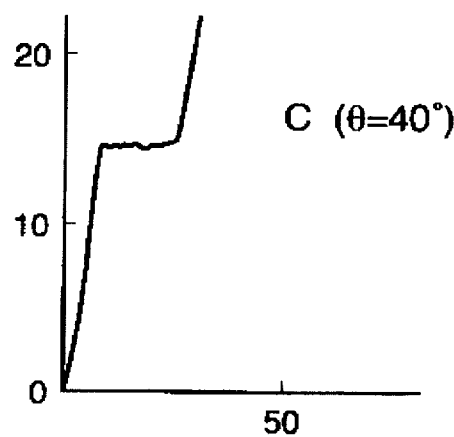
Figure 10B:
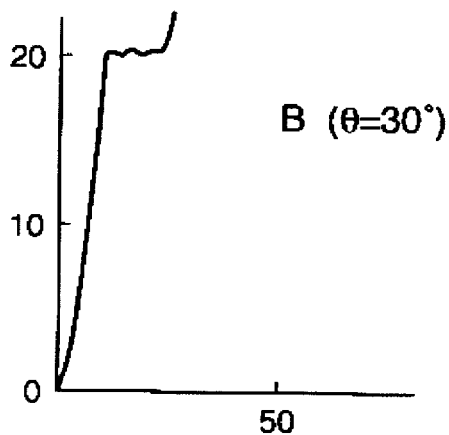
Figure 10D:
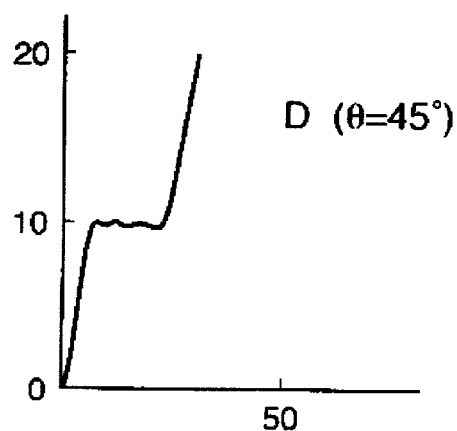
Figure 10E:
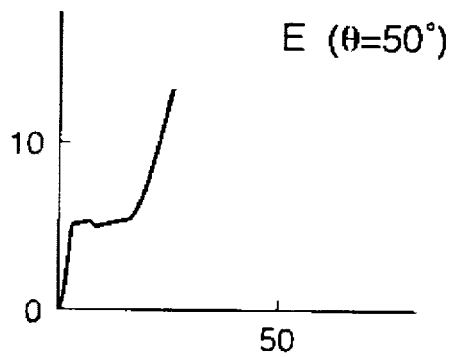

The results of vibration test of this paper cushioning mat are shown also in Table 1; and the results of compression tests, also in FIG. 9. For comparison the same tests were made on the conventional discrete cushioning material made of foamed polystyrene. The results are shown also in Table 1 and FIG. 9.

TABLE 1

| No. | | Dimension of Gaps (mm) | | Necessary Amount of Cushioning Material (Apparent Density) |
|---|---|---|---|---|
| | | Before Test | After Test | |
| Example 1 | Side 1 | 40 | 39.5 | 149 (approximately 10) |
| | Side 2 | 70 | 70 | |
| | Side 3 | 50 | 50.5 | |
| | Side 4 | 60 | 60 | |
| Example 2 | Side 1 | 40 | 40 | 189 (approximately 12) |
| | Side 2 | 70 | 70 | |
| | Side 3 | 50 | 50 | |
| | Side 4 | 60 | 60 | |
| Control 1 | Side 1 | 40 | 41 | 139 (approximately 9) |
| | Side 2 | 70 | 68 | |
| | Side 3 | 50 | 49 | |
| | Side 4 | 60 | 62 | |

EXAMPLE 3

A paper cushioning mat illustrated in FIG. 6 was produced.

In Example 2, a single faced corrugated fiberboard made of a corrugating medium and a liner board with a basic weight of 50 g/m$^2$ and corrugation ratio 1.6 was rolled spirally on a paper tube mentioned above with the flutes inside to form a hollow coil. The coil was cut crosswise with inclination angles of 0°, 30°, 40°, 45° and 50° to prepare cushioning pieces of 15 mm high.

A craft paper substrate of basic weight 50 g/m$^2$ was processed to give perforation of 75 mm pitch in length and width, and between two paper substrates the cushioning pieces of various inclination angles were distributed and adhered thereto with starch paste to produce the cushioning mat of the present invention.

Compression tests were carried out on these cushioning mats with a distortion speed of 15 mm/min. to determine the buckling strength and distortions. The results are shown in Table 2.

TABLE 2

| No. | Inclination Angle (θ°) | Initial Buckling Strength (kg) | Distortion (%) | Distortion at Bottoming (%) |
|---|---|---|---|---|
| A | 0 | 25–30 | 15 | 25 |
| B | 30 | 20 | 10 | 70 |
| C | 40 | 15 | 8 | 20–30 |
| D | 45 | 10 | 6 | 10–15 |
| E | 50 | 5 | 4 | –10 |

We claim:

1. A paper cushioning mat comprising two paper substrates and multiple paper cushioning pieces distributed between the substrates, the paper cushioning pieces being made by rolling a single faced corrugated fiberboard and fixing with an adhesive to form a coil, and cutting the resulting coil crosswise to slices having a height to diameter ratio wherein H<2D and adhering cut ends of the cushioning pieces to the paper substrates.

2. A paper cushioning mat according to claim 1, wherein the paper cushioning pieces are made by cutting a coil prepared by rolling a single faced corrugated fiberboard in an vortex form and fixing at least the outermost edge thereof with an adhesive.

3. A paper cushioning mat according to claim 1, wherein the paper cushioning pieces are made by cutting a coil prepared by rolling a single faced corrugated fiberboard in a spiral on a paper tube and fixing overlapped edges of said spiral rolled fiberboard with an adhesive.

4. A paper cushioning mat according to one of claims 2 and 3, wherein direction of cutting the coil to the paper cushioning pieces is inclined in an angle not substantially less than 20° and not substantially more than 50° direction rectangular to the axis of the coil.

5. A paper cushioning sheet according to one of claims 1 to 3, wherein a sticking agent is applied on a part of the outer surfaces of the substrates.

6. A paper cushioning mat according to one of claims 1 to 3, wherein the substrates are perforated at least in one of length and width at a certain pitch.

7. A paper cushioning mat according to one of claims 1 to 3, wherein distribution of the cushioning pieces on the substrates is in lattice form.

8. A paper cushioning mat according to one of claims 1 to 3, wherein distribution of the cushioning pieces on the substrates is in staggered form.

9. A method of producing paper cushioning mat comprising the steps of:

a) preparing a single faced corrugated fiberboard tape in which direction of the flutes is inclined to the direction rectangular to the longitudinal direction of the tape by adhering a corrugated board on a paper tape with providing margin to paste up at one edge;

b) rolling the single faced corrugated fiberboard prepared in the above step (a) on a paper tube spirally under application of an adhesive on the margin to paste up to form a hollow coil;

c) cutting the above hollow coil prepared in the above step (b) to produce plural cushioning pieces having a height to diameter ratio wherein H<2D; and d) distributing the cushioning pieces produced in the above step (c) between two paper substrates and adhering both the ends of the cushioning pieces to the paper substrates.

10. A paper cushioning sheet according to claim 4, wherein a sticking agent is applied on a part of the outer surface of the substrates.

11. A paper cushioning mat according to claim 4, wherein the substrates are perforated at least in one of length and width at a certain pitch.

12. A paper cushioning mat according to claim 4, wherein distribution of the cushioning pieces on the substrates is in lattice form.

13. A paper cushioning mat according to claim 4, wherein distribution of the cushioning pieces on the substrate is in staggered form.

* * * * *